United States Patent
Patel

(10) Patent No.: US 10,771,245 B2
(45) Date of Patent: Sep. 8, 2020

(54) SYSTEMS AND METHODS FOR USE IN COMPUTER NETWORK SECURITY

(71) Applicant: MASTERCARD INTERNATIONAL INCORPORATED, Purchase, NY (US)

(72) Inventor: Keyur Patel, Jersey City, NJ (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 315 days.

(21) Appl. No.: 15/958,289

(22) Filed: Apr. 20, 2018

(65) Prior Publication Data

US 2019/0327085 A1  Oct. 24, 2019

(51) Int. Cl.
| | |
|---|---|
| *H04L 9/08* | (2006.01) |
| *H04L 29/06* | (2006.01) |
| *H04L 9/32* | (2006.01) |
| *G06F 21/62* | (2013.01) |

(52) U.S. Cl.
CPC .......... *H04L 9/085* (2013.01); *G06F 21/6245* (2013.01); *H04L 9/0861* (2013.01); *H04L 9/0894* (2013.01); *H04L 9/3213* (2013.01); *H04L 63/062* (2013.01); *H04L 63/12* (2013.01); *H04L 63/0428* (2013.01)

(58) Field of Classification Search
CPC ..... G06F 21/6245; H04L 9/085; H04L 9/321; H04L 9/3213; H04L 63/0428
See application file for complete search history.

(56) References Cited

U.S. PATENT DOCUMENTS

| | | | |
|---|---|---|---|
| 2002/0026575 A1* | 2/2002 | Wheeler | ............. H04L 63/0823 713/156 |
| 2005/0055296 A1 | 3/2005 | Hattersley et al. | |
| 2008/0178271 A1* | 7/2008 | Gajjala | ................... H04L 63/08 726/6 |

(Continued)

FOREIGN PATENT DOCUMENTS

| | | |
|---|---|---|
| JP | 2006268584 A2 | 10/2006 |
| WO | WO2017/134759 | 8/2017 |

OTHER PUBLICATIONS

Wikipedia "Shamir's Secret Sharing"; https://en.wikipedia.org/wiki/Shamir%27s_Secret_Sharing; web accessed Feb. 7, 2018; 7 pgs.

(Continued)

*Primary Examiner* — Khang Do
(74) *Attorney, Agent, or Firm* — Harness, Dickey & Pierce, P.L.C.

(57) ABSTRACT

Systems and methods are provided for managing data across a network based on multiple keys assigned to different participants in association with the data. One exemplary method includes identifying, by an originating party, a relying party, identifying data relevant to at least one interaction between the originating party and the relying party, and encrypting the data based on a secret. The method also includes generating a key set based on the secret, where the key set has at least three keys and is structured such that the secret is derivable from at least two of the at least three keys, and disseminating a first key of the key set and the encrypted data to a control party and disseminating a second key of the key set to the relying party.

20 Claims, 4 Drawing Sheets

(56) References Cited

U.S. PATENT DOCUMENTS

| | | | |
|---|---|---|---|
| 2011/0302083 A1* | 12/2011 | Bhinder | G06Q 20/32 |
| | | | 705/44 |
| 2011/0314280 A1 | 12/2011 | Nonaka et al. | |
| 2012/0302840 A1 | 11/2012 | Kubo | |
| 2015/0332029 A1* | 11/2015 | Coxe | H04L 63/06 |
| | | | 726/9 |
| 2017/0149796 A1* | 5/2017 | Gvili | H04L 9/085 |
| 2017/0250972 A1* | 8/2017 | Ronda | H04L 9/3236 |
| 2018/0219846 A1* | 8/2018 | Poschel | H04L 63/08 |
| 2019/0164221 A1* | 5/2019 | Hill | G06Q 20/36 |
| 2019/0228469 A1* | 7/2019 | Yu | H04L 9/3239 |
| 2019/0251269 A1* | 8/2019 | Cohen | G06Q 10/00 |

OTHER PUBLICATIONS

Shamir, A., How to Share a Secret, Communications of the ACM, Nov. 1979, vol. 22, issue 11, p. 612-613.

* cited by examiner

SYSTEMS AND METHODS FOR USE IN COMPUTER NETWORK SECURITY

FIELD

The present disclosure is generally directed to systems and methods for use in managing data security across computer networks, and in particular, to systems and methods for use in managing confidential electronic data, such as, for example, personal identifying information (PII), across networks based on multiple keys.

BACKGROUND

This section provides background information related to the present disclosure which is not necessarily prior art.

People, in general, are associated with identities (including personal identifying information (PII)). The identities are, at least in part, secrets particular to the people, which may be shared by the people with other people or entities to facilitate one or more interactions. For example, a person may share his/her identity with a banking institution to acquire an account with the banking institution. As identities are shared, both in person and electronically, secure storage and maintenance of the identities is important to guard them from being discovered by unauthorized users. In connection therewith, it is known to employ block chain, for example, to secure digital identities. What's more, in certain instances, identities may be encrypted, where a key may be used to encrypt and decrypt data associated with an encrypted identity, such that unauthorized access to the encrypted identity alone is insufficient to reveal the actual data, secret, etc. associated therewith.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
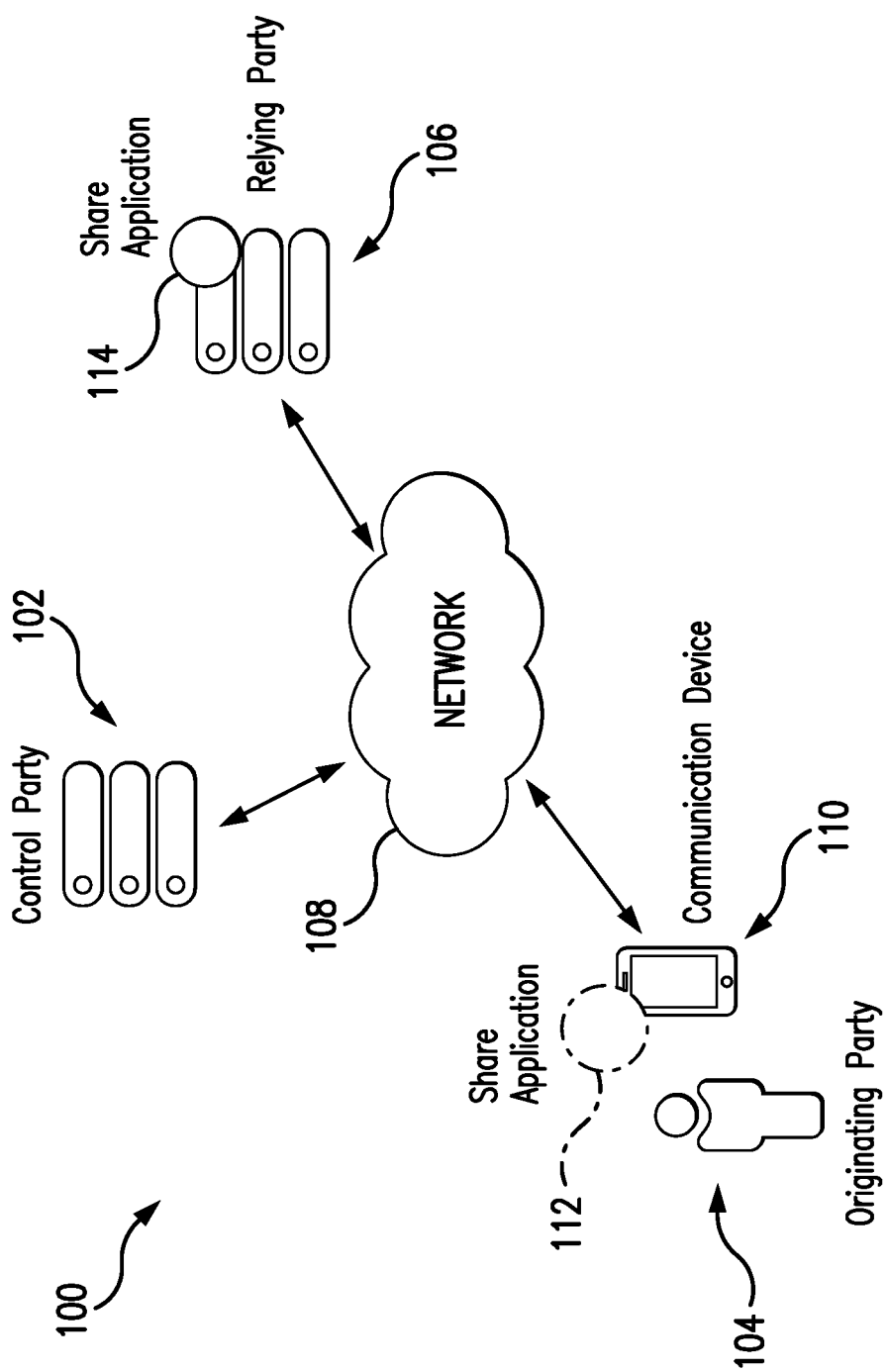
FIG. 1 is an exemplary system of the present disclosure suitable for use in managing data across a network, based on key sets.

Exemplary embodiments will now be described more fully with reference to the accompanying drawings. The description and specific examples included herein are intended for purposes of illustration only and are not intended to limit the scope of the present disclosure.

Personal identifying information (PII) is often transferred across computer networks, or stored within computer networks, as a means of facilitating interactions between participants to the transfers (e.g., including users or entities generating the PII, storing the PII, disseminating the PII, viewing the PII, or performing operations with respect to the PII, etc.). When the PII, however, is not secured sufficiently, the PII may be vulnerable to unauthorized users and become known to such unauthorized users, which in turn may cause harm to a person or entity associated with the PII. For example, where PII includes a government ID number, the person associated with the government ID number may be harmed, for example, by identity theft, if the information becomes known to an unauthorized user—even if/when encrypted. This may occur when a single entity holding the information exposes not only the encrypted PII to the unauthorized user, but also a means of decrypting or otherwise understanding the encrypted information.

Uniquely, the systems and methods herein provide for a distribution of encrypted data and different keys for the encrypted data among multiple parties, so that multiple different keys are necessary to decrypt and reveal the encrypted data. In particular, an originating party, a relying party, and a control party each possess data, which is encrypted by a key (i.e., a secret). The key is then segregated into a key set having three different keys, for example, with one key and the encrypted data being provided to each of the originating party, the relying party, and the control party. When the relying party wants to receive data about the originating party, such as, for example, a credit report, the relying party provides the encrypted data and its key to the control party, as part of a request, whereupon the control party uses the key from the relying party and its own key to decrypt the data. The control party then responds to the request from the relying party for the credit report (without necessarily providing the decrypted data to the relying party), whereby the relying party may rely, as needed, on the output from the control party to interact with the originating party. In this manner, even if one of the originating party, the relying party, and the control party is breached and the encrypted data and key are stolen, for example, the encrypted data and the key are essentially useless without a key from another, different party. Thus, there is limited or no risk of the encrypted data being revealed. The systems and methods herein thus provide an improvement to network security through a more robust, efficient, and secure manner of storing and maintaining information, while still permitting access to the information to multiple parties, when appropriate, and while, at the same time, limiting the risk of unauthorized access to the information posed by the traditional vulnerability of a single participant controlling encryption/decryption of the information.

FIG. 1 illustrates an exemplary system 100, in which one or more aspects of the present disclosure may be implemented. Although the system 100 is presented in one arrangement, other embodiments may include the parts of the system 100 (or other parts) arranged otherwise depending on, for example, relationships among different participants, particular types of devices utilized to pass and/or store keys, information, etc., types of information to be maintained, privacy requirements, etc.

As shown in FIG. 1, the illustrated system 100 generally includes a control party 102, an originating party 104 (broadly, a user), and a relying party 106. Each of the control party 102 and the relying party 106 includes (or is associated with) a computing device, coupled to and/or in communication with a network 108. In addition, the originating party 104 is associated with a communication device 110, which is also coupled to and/or in communication with the network 108. The network 108 may include, for example, one or more of, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof.

In general, the originating party 104 includes an entity and/or person, which originates, owns, and/or provides data that is intended to be maintained as confidential and not shared with others, unless directed or permitted by the originating party 104. In this exemplary embodiment, the data includes PII related to the originating party 104. The PII of the originating party 104 may include different attribute data, which distinguishes the originating party 104, alone or in combination, from one or more other parties/users. Exemplary attribute data may include, without limitation, a name of the originating party 104, a mailing address, a birthdate, contact information (e.g., a phone number, an email address, etc.), a birthplace, genetic information, member ID numbers, payment account numbers, IP addresses, national identification numbers, vehicle identification numbers, biometrics (e.g., fingerprints, facial images, etc.), a government ID number (e.g., a social security number, etc.), or any other desired attribute or personal identifying information of the originating party 104, etc. In addition, the attributes of the PII of the originating party 104 may be evidenced by one or more physical documents, such as, for example, a passport, a government issued ID, a social security card, a health insurance card, a bank statement, an employee ID, a library card, a utility bill, etc.

Also in the system 100, and as indicated above, the originating party 104 is associated with the communication device 110. In the illustrated embodiment, the communication device 110 includes a share application 112, which is a network-based and/or network-enabled application. In connection therewith, the communication device 110 is configured, by the share application 112, to interact with the control party 102 and the relying party 106, as described in more detail below (e.g., to facilitate encryption of PII, sharing of PII, etc.). The share application 112 may be created, provided and/or disseminated by the control party 102, alone or in connection with an application provided and/or disseminated by a third party (e.g., included and/or integrated with an application with additional features or functionalities (e.g., a banking application, etc.), etc.). In general, the originating party 104 will sign up or register to the control party 102, through the share application 112 (i.e., with the control party 102 being and/or providing a backend for the share application 112) upon download and/or installation of the share application 112 (or later). In this manner, the originating party 104 is known to the control party 102 through the share application 112.

The relying party 106 in the system 100 includes any entity and/or person, which receives the PII from the originating party 104 and expects and/or intends to rely on the PII for one or more purposes. The one or more purposes may relate to one or more arrangements and/or interactions between the originating party 104 and the relying party 106, or otherwise, whereby the originating party 104 (or an aspect/fact associated with the origination party (e.g., a credit score, etc.)) is to be identified to the relying party (broadly, identification interaction) (e.g., a banking interaction between the originating party 104 as a consumer user and the relying party 106 as a financial institution (e.g., to open an account, applying for a loan, etc.), interaction(s) related to business between the parties, interaction(s) to request and/or apply for services (e.g., related to utilities, telecommunications, health, etc.), etc.). In the illustrated embodiment, the relying party also includes a share application 114, which is a network-based and/or network-enabled application. In connection therewith, the share application 114 of the relying party 106 may be the same as or different than the share application 112 of the originating party 104. But like above, the share application 114 associated with the relying party 106 is provided to configure the relying party 106, i.e., as implemented in a computing device, to operate as described herein (e.g., to facilitate encryption of PII, sharing of PII, etc.). In this manner, the share application 114 is also created, provider, or disseminated by the control party 102, whereby the share application 114 may be a standalone application, be part of an application from the control party 102 and employed by the relying party 106, or be included in a software development kit (SDK) to be integrated with another application or tool of the relying party 106.

And, the control party 102 in the system 100 is configured to cooperate with the originating party 104 to disseminate encrypted PII and corresponding keys to the relying party 106.

For example, the originating party 104 may desire to provide certain data, such as, for example, PII (e.g., a government ID number specific to the originating party 104, etc.) or other data specific to the originating party 104, to the relying party 106. To do so, the originating party 104 initially accesses the share application 112, whereby the communication device 110, as configured by the share application 112, solicits the originating party 104 to identify the relying party 106 (e.g., solicit a selection of the relying party 106 (from a listing or pull down of available relying parties) (or an entry of the relying party 16) to which the identity (or PII) of the originating party is to be shared, etc.). In addition, the communication device 110, as configured by the share application 112, solicits the originating party 104 to identify and/or designate particular data to be shared with the relying party 106. In response, the originating party 104 identifies the relying party 106 and the data to be shared with the relying party 106, through one or more inputs to the communication device 110. In other words, the originating party provides the desired data to the communication device 110, and specifically, to the share application 112, and thereafter decides to share the data with the relying party 106.

When the relying party 106 and the data to be shared is identified, the communication device 110, as configured by the share application 112, encrypts the data based on a secret (e.g., a private key, etc.) and then generates a key set from the secret, where the key set includes multiple different keys. In this exemplary embodiment, in particular, the communication device 110, as configured by the share application 112, is configured to generate the secret, to encrypt the data based on the secret, and then to generate the key set to include multiple different keys (e.g., three keys including a first key, a second key, and a third key; etc.), for example, based on the secret and a Shamir secret sharing algorithm. Specifically, the key set is generated, in such a manner, that multiple, but less than all, of the multiple different keys may be used to decrypt the encrypted data. That is, for example, where, the key set includes three different keys, only two of the keys are necessary to decrypt the data, but one key, alone, would be insufficient to decrypt the data. Stated generally, the key set is generated based on the Shamir secret sharing algorithm and the secret to have N keys, where N is an integer greater than 2 (e.g., 3, 4, 5, etc.). The secret, then, may be derived (i.e., is derivable) from N−1 of the keys in the key set. In another example, where the key set includes five different keys (i.e., N=5), the keys may be generated through the Shamir secret sharing algorithm, and based on the secret, in such a manner than three or more of the keys (e.g., N−1 or N−2 keys, etc.) may be used to decrypt the data, but two or less keys would be insufficient to decrypt the data. As should be appreciated, the key set may include a different number of keys in other examples consistent with the above, but, again, less than all keys in the key set will be required to decrypt the secret, upon which the key set is generated.

In turn, in the example where the key set includes three different keys, the communication device 110, as configured by the share application 112, stores the first key of the key set along with the encrypted data in memory associated therewith (e.g., local memory at the communication device 110, etc.). In addition, the communication device 110, as configured by the share application 112, transmits (or disseminates) the second key, with or without the encrypted data, to the control party 102, whereupon the control party 102 is configured to receive and store the second key and the encrypted data (when also transmitted/disseminated) in memory associated therewith. Further, the communication device 110, as configured by the share application 112, transmits (or disseminates) the third key (and, in some embodiments, the encrypted data) to the relying party 106 (as identified by the originating party 104), whereupon the relying party 106, as configured by the share application 114, receives and stores the key (and encrypted data, when also included) in memory associated therewith.

Optionally, the communication device 110 may be further configured, by the share application 112, to provide/transmit a token, such as, for example, an originating party ID, an email address, a phone number, etc., to the relying party 106 with the third key (and the encrypted data, when also included) to identify the third key and/or encrypted data to the originating party 104. When the token is provided, or included with the third key and/or encrypted data, the relying party 106, as configured by the share application 114, may store the third key and/or the encrypted data in associated with the token, so that the relying party 106 may retrieve the third key and/or encrypted data based on the token when presented therewith. The token may also be transmitted, by the communication device 110, to the control party 102 for use in the same or similar manner (e.g., with the second key and encrypted data, when also included, being stored by the control party 102 in association with the token, so that the control party 102 may subsequently retrieve the second key and/or encrypted data based on the token when presented therewith; etc.).

In connection with the above example, the originating party 104 may expect and/or intends to interact with the relying party 106, for example, to open a credit account with the relying party 106 (or take part in some other interaction(s) with the relying party 106, be it financial-related or otherwise). When the originating party 104 requests the credit account, in this example, the relying party 106, as configured by the share application 114, determines a credit score is necessary to open the account, and then locates the encrypted data (when disseminated to the relying party 106 by the originating party 104) and the key for the originating party 104 (e.g., based on the token (e.g., as submitted by the originating party 104 with the credit account request, etc.), etc.) and submits a request for the credit score to the control party 102 (broadly, a verification request). The request for the credit score includes the third key and the encrypted data and/or token, as originally provided to the relying party 106 by the originating party 104 (however, it is contemplated that in at least one embodiment, the request from the relying party 106 may only include the third key, for example, where the control party 102 already includes the corresponding encrypted data).

In response, the control party 102 is configured to retrieve the second key from memory (e.g., based on the token, or not; etc.) and to derive the secret and then to decrypt the encrypted data received from the relying party 106 (or additionally retrieve the encrypted data from the memory when the relying party 106 does not transmit the encrypted data with the third key), through use of the second key (provided to the control party 102 by the originating party 104) and through use of the third key received from the relying party 106. When the data is decrypted, the control party 102 is configured to use the decrypted data to verify the identity of the originating party (e.g., based on a name, address, birthdate, of other data included in the verification request, etc.) and, when the identity is verified, to respond to the request from the relying party 106. For example, the control party 102 may be configured to submit a request for a credit score (i.e., run a credit check) to a credit bureau based on use of the decrypted data (e.g., a government ID, etc.), in order to respond to the verification request related to the originating party 104. In turn, the control party 102 is configured to receive a response (from the credit bureau) that includes the credit score (e.g., from the credit bureau, etc.), and pass the credit score (or an indication of a range of the credit score) back to the relying party 106 in response to the original request. In this example, the information included in the reply from the control party 102 to the relying party 106 (i.e., the credit score or range thereof) is based on the encrypted data originally provided by the originating party 104 but does not actually include the encrypted data. In other examples, the information included in the reply may additionally (or alternatively) include at least some or all of the actual encrypted data itself (instead of merely being "based on" the encrypted data).

In response, the relying party 106 may be configured to rely on the response from the control party 102 and continue to process associated with the originating party's request to share the information with the originating party 104 (e.g., the application for the new account, etc.).

With that said, it should be appreciated that various different requests (e.g., relating to different interactions between the originating party 104 and the relying party 106, etc.) may be provided, from the relying party 106 to the control party 102, which rely on the encrypted data held by the control party 102 and/or the relying party 106 in association with the originating party 104, and whereby the encrypted data is suitable for decryption by the multiple keys of the key set.

It should also be appreciated that the originating party 104 may desire and/or intend to alter, modify, or confirm, etc. the encrypted data that is to be provided to (or that has already been provided to) the control party 102 and/or the relying party 106, whereupon the originating party 104 may provide the encrypted altered data (as part of a request) or a request to confirm the existing encrypted data to the control party 102 or the relying party 106, along with the first key (and, in one or more embodiments, the token), via the communication device 110, as configured by the share application 112. In response, when the request is provided to the control party 102, for example, the control party 102 is configured to retrieve the second key for the originating party 104 from memory (e.g., based on the token provided by the originating party 104 with the altered data, or not; etc.) and to decrypt the encrypted altered data with the second key and with the first key received from the originating party 104.

The control party 102 is configured to then update the existing data for the originating party 104 and/or confirm that data, as appropriate, based on the received request. In connection therewith, when the request relates to updating or modifying existing encrypted data, the control party 102 may be configured to, upon receipt of the altered data, to decrypt the encrypted data, update the data as necessary, and then encrypt the data all with the second key (stored therein) and the first key received from the originating party 104 with the altered data. It should be appreciated that the control party 102 may be further configured to further encrypt the data based on, for example, an RSA (Rivest-Shamir-Adleman) key, etc., in addition to the above encryption. Thereafter, the control party 102 is configured to store the encrypted data (i.e., the encrypted altered data) in memory, in association with the second key (and, in one or more embodiments, in association with the token of the originating party 104), for later use in response to a request from the relying party 106. What's more, the control party 102 may further store the encrypted data in one or more secure manners in the memory therein (e.g., via standard processes such as a hardware security module (HSM), etc.).

Figure 2:
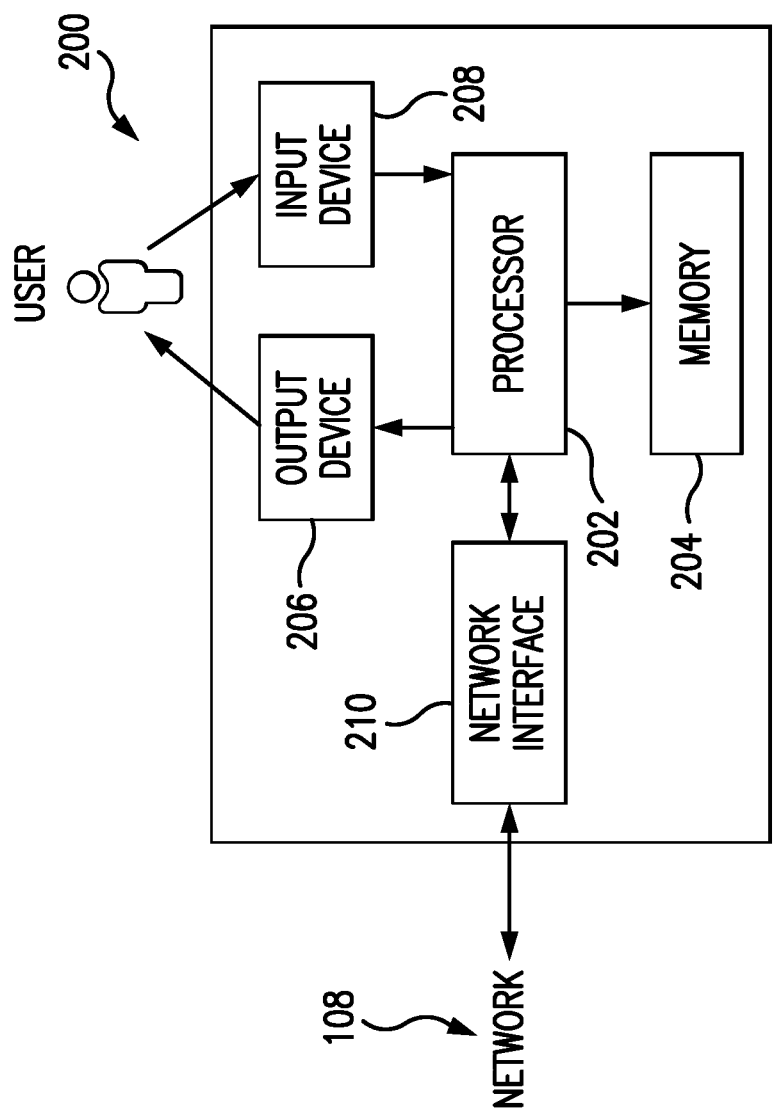
FIG. 2 is a block diagram of a computing device that may be used in the exemplary system of FIG. 1.

FIG. 2 illustrates an exemplary computing device 200 that can be used in the system 100 of FIG. 1. The computing device 200 may include, for example, one or more servers, workstations, personal computers, laptops, tablets, smartphones, etc. In addition, the computing device 200 may include a single computing device, or it may include multiple computing devices located in close proximity or distributed over a geographic region, so long as the computing devices are specifically configured to function as described herein. In the exemplary embodiment of FIG. 1, each of the control party 102, the relying party 106, and the communication device 110 associated with the originating party 104 includes and/or is implemented in one or more computing devices consistent with computing device 200. However, the system 100 should not be considered to be limited to the computing device 200, as described below, as different computing devices and/or arrangements of computing devices may be used in other embodiments. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, identity attributes, secrets, encrypted data, key sets, keys, tokens, and/or other types of data (and/or data structures) suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 and/or other computer system components as specifically configured, but such instructions, to perform one or more of the various particular and unique operations herein. It should be appreciated that the memory 204 may include a variety of different memories, each implemented in one or more of the functions or processes described herein.

In the exemplary embodiment, the computing device 200 also includes an output device 206 that is coupled to (and is in communication with) the processor 202 (however, it should be appreciated that the computing device 200 could include one or more additional output devices other than the output device 206, etc.). The output device 206 outputs information (e.g., prompts to identify relying parties to receive shared data, or to identify data to be shared, etc.), visually or audibly, for example, to a user of the computing device 200, etc. And, various interfaces (e.g., as defined by share applications 112 and/or 114, etc.) may be displayed at computing device 200, and in particular at the output device 206, to display certain information in connection therewith. The output device 206 may include, without limitation, a presentation unit such as a liquid crystal display (LCD), a light-emitting diode (LED) display, an organic LED (OLED) display, an "electronic ink" display, etc.; or another output device such as a speaker, another computer, etc.; etc. In some embodiments, the output device 206 may include multiple devices.

In addition, the computing device 200 includes an input device 208 that receives inputs from the user (i.e., user inputs) of the computing device 200 such as, for example, inputs by the originating party 104 to the communication device 110 to identify the relying party 106, to identify data to be shared, etc., as further described below. The input device 208 may include a single input device or multiple input devices. The input device 208 is coupled to (and is in communication with) the processor 202 and may include, for example, one or more of a keyboard, a pointing device, a mouse, a touch sensitive panel (e.g., a touch pad or a touch screen, etc.), another computing device, and/or an audio input device. In various exemplary embodiments, a touch screen, such as that included in a tablet, a smartphone, or similar device, may behave as both the output device 206 and an input device 208.

Further, the illustrated computing device 200 also includes a network interface 210 coupled to (and in communication with) the processor 202 and the memory 204. The network interface 210 may include, without limitation, a wired network adapter, a wireless network adapter, a mobile network adapter, or other device capable of communicating to one or more different ones of the networks herein, including network 108, and/or with other devices described herein. In some exemplary embodiments, the computing device 200 may include the processor 202 and one or more network interfaces incorporated into or with the processor 202.

Figure 3:
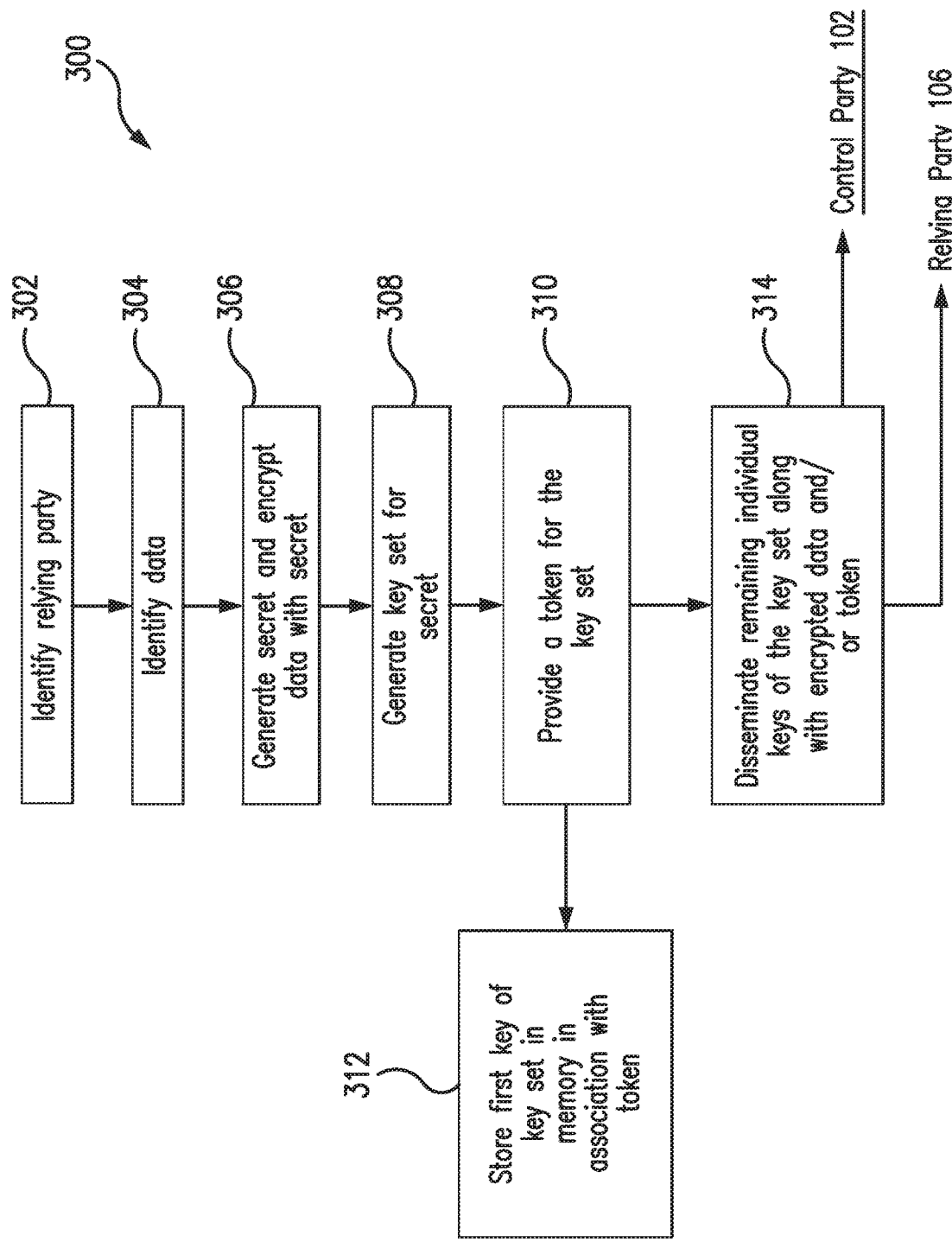
FIG. 3 is a flow diagram for an exemplary method, which may be implemented in connection with the system of FIG. 1, for managing data across a network based on key sets.

FIG. 3 illustrates an exemplary method 300 for use in managing data across a network based on key sets. The exemplary method 300 is described as implemented in the control party 102, the originating party 104, and the relying party 106 of the system 100. Reference is also made to the computing device 200. However, the methods herein should not be understood to be limited to the system 100 or the computing device 200, as the methods may be implemented in other systems and/or computing devices. Likewise, the systems and the computing devices herein should not be understood to be limited to the exemplary method 300.

Initially in the method 300, the originating party 104 decides to interact with the relying party 106, whereby the interaction(s) is(are) dependent on data associated with the originating party 104, such as, for example, PII, other information specific to the originating party 104, etc. For purpose of illustration, the data to be relied upon in this example includes, generally, a government ID number for the originating party 104, such as, for example, a social security number, and a mailing address for the originating party 104. With that said, the operations of method 300 are described below with reference to the communication device 110 and/or the share application 112. In this manner, it should be understood that either or both (in coordination) of the communication device 110 and/or the share application 112 may carry out the expressed method operations.

In connection therewith, in the method 300, the originating party 104 initially accesses the share application 112, at the communication device 110, and provides an input associated with the relying party 106, whereby the communication device 110 (and/or the share application 112) identifies, at 302, the relying party 106 as a party to which originating party's data is to be accessible. In so doing, the originating party 104 may be presented with an interface, at the communication device 110 (and in particular, at the output device 206), as defined by the share application 112, which includes a drop-down menu (or box) from which multiple different available relying parties may be selected. The listing of available relying parties may be generated by registration of the relying parties (e.g., onboarding of the relying parties, etc.) to the share application 112, to the control party 102, etc. Alternatively, the originating party may be presented with an interface, at the communication device 110 (and in particular, at the output device 206), as defined by the share application 112, which includes a text box where the originating party 104 may enter (via the input device 208) the name of and/or an identifier for the relying party 106, etc., whereby the communication device 110 and/or the share application 112 are then able to identify the relying party 106.

In addition, the originating party 104 selects and/or inputs particular data to be accessible to the relying party 106, via one or more inputs to the communication device 110 (at the input device 208), whereupon the communication device 110 and/or the share application 112 identifies, at 304, the originating party's data to be accessible to the relying party 106 (e.g., data relevant to at least one interaction (e.g., an identification interaction, etc.) between the originating party 104 and the relying party 106, etc.). In connection therewith, the originating party 104 may maintain, add, enter, or provide a variety of data at or to the share application 112, which may then be selected by the originating party 104, at 302, or which may then be otherwise provided by the originating party 104, via one or more inputs from the originating party 104 (i.e., user inputs), as data to be shared, directly or indirectly, with the relying party 106. As noted above, in this example the data includes a government ID number for the originating party 104 and the address of the originating party 104 (e.g., identifying data specific to the originating party 104, etc.). However, it should be appreciated that the data may also, or alternatively, include, without limitation, one or more of a name of the originating party 104, a birthdate of the originating party 104, contact information (e.g., a phone number, an email address, etc.) for the originating party 104, a birthplace of the originating party 104, genetic information for the originating party 104, member ID numbers for the originating party 104, payment account numbers for the originating party 104, IP addresses for the originating party 104, national identification numbers of the originating party 104, vehicle identification numbers for the originating party 104, biometrics (e.g., fingerprints, face, etc.) of the originating party 104, or any other desired attribute or PII of the originating party 104, etc.

With that said, the originating party may select the particular data, in whole or in part, to be accessible to the relying party 106 (i.e., actively or by default). In general, the originating party 104 may select and/or provide data, which is related to a potential relationship and/or interaction with the originating party 104. In the current example, where the originating party 104 is attempting to open a credit account with the relying party 106 (e.g., as a banking institution, etc.), a membership ID number for the originating party 104 at a third party may not be relevant, but the originating party's government ID number associated with his/her credit score, along with the originating party's mailing address, may be relevant. Here, the particular data includes the government ID number for the originating party 104, which is 111-22-333, and the mailing address for the originating party 104, which is 321 Main Street, City, State, 98765.

With continued reference to FIG. 3, when the relying party 106 is identified at the share application 112, and the data to be accessible to the relying party 106 is identified, the communication device 110 and/or the share application 112 encrypts, at 306, the identified data with a secret. Specifically, for example, the communication device 110, via the share application 112, generates a private key (broadly, the secret), which is unknown outside of the communication device 110, and applies the private key, as an encryption key, to the identified data, thereby encrypting the data, at 306. The private key (or, more generally, the secret) may be any suitable type of key and may be generated by any suitable manner, often, for example, based on a specification and/or standard for the encryption of the data as is generally known. An exemplary secret, or private key, which may be generated by the communication device 110 for use in encrypted desired data is depicted in Table 1.

TABLE 1

| Private Key |
| --- |
| 12345678901234567890123456789012345678912345678912312312312332 |

With that said, for example, the particular data to be encrypted using the secret may include a social security number for the originating party 104 (e.g., 111-22-3333, etc.). The communication device 110 may then encrypt the particular data, using the secret, based on the Advanced Encryption Standard (AES) cipher algorithm in Cipher Bock Chaining (CBC) mode (or, other suitable encryption algorithm (e.g., symmetric encryption, etc.), such as, for example, AES-Galois/Counter Modes of Operation (GCM), etc.). In connection therewith, Table 2 illustrates such particular data, as may be encrypted.

TABLE 2

Encrypted Data ftP9iZTEuq3b1yjVIX/fXQ

Once the data is encrypted, the communication device 110 and/or the share application 112 generates, at 308, a key set (including multiple key parts) for the secret, or in this example, the private key, by use of the Shamir secret sharing algorithm. It should be appreciated that a different algorithm may be used in other examples, so long as the algorithm is used to generate a key set having multiple different keys, where at least two or more of the keys, but less than all keys in the key set, are necessary for decryption of the encrypted data (as encrypted by the given private key). In this example, by use of the Shamir secret sharing algorithm, the communication device 110 and/or the share application 112 generates a key set, based on the private key, having three keys (where the encrypted data may be decrypted by any two of the three keys of the key set). Table 3 includes a key set of three example keys, which may be generated based on the private key from Table 1 and the Shamir secret sharing algorithm.

TABLE 3

| Key Number | Key Parts for Private Key |
| --- | --- |
| 1st Key | 189340625919375598251360516408294219418030299799598791856 0377850 |
| 2nd Key | 198828017578858317633510791297676709625581020986903871456 6641181 |
| 3rd Key | 857666386649157511134770276479384335914649451091660558785 706699 |

In addition to the encrypted data and the key set, the communication device 110 and/or the share application 112, in this example, generates, retrieves or otherwise provides, at 310, a token associated with the originating party 104. The token may include, without limitation, a unique identifier or ID for the originating party 104, an email address of the originating party 104, a phone number of the originating party 104, or another suitable sequence of characters (e.g., alpha, numeric, or both, etc.) associated with or corresponding to the originating party 104. Thereafter, at 312, the communication device 110 and/or the share application 112 stores a first key of the key set in the memory (e.g., memory 204, etc.) of the communication device 110, in association with the token. In so doing, the communication device 110 and/or share application 112 may further store the encrypted data in the memory, in association with the token, as desired and/or needed. Then, the communication device 110 and/or the share application 112 deletes or otherwise removes the private key from the communication device 110. As such, it should be appreciated that once the data is encrypted and the key set is generated, the key set is the only viable, or suitable, manner by which the encrypted data is to be decrypted.

Next in the method 300, the communication device 110 and/or the share application 112 disseminates, at 314, the remaining individual keys of the key set, alone, or with the encrypted data and/or the token, to the parties intended to rely on and/or use the encrypted data. Specifically, as shown in this example in FIG. 3, the communication device 110 and/or the share application 112 disseminates (at 314) the second key along with the encrypted data and/or the token to the control party 102. In response, the control party 102 stores the second key, the encrypted data (if provided), and the token (if provided) in memory associated therewith (e.g., the memory 204, etc.), whereby the second key may be retrieved, from the memory, based on the token when provided. And, likewise, as shown in FIG. 3, the communication device 110 and/or the share application 112 disseminates (at 314) the third key along with the encrypted data and/or the token to the relying party 106. In response, the relying party 106, and in particular, the share application 114, at the computing device of the relying party 106, receives and stores the third key, the encrypted data (if provided), and the token (if provided) in memory associated therewith (e.g., the memory 204, etc.), whereby the third key may be retrieved, from the memory, based on the token when provided.

It should be appreciated that the communication device 110 and/or the share application 112 may further disseminate keys of the key set, along with the encrypted data and/or the token to additional relying parties and/or control parties that are to be included in maintaining the encrypted data as accessible. In at least one embodiment, the token is not provided by the communication device 110 and/or the share application 112, to the relying party 106, as it is provided otherwise, or already known to the relying party 106 (e.g., in connection with an application for a credit account, etc.). In one or more other embodiments, the token may not be provided or used at all.

With that said, based on method 300, the control party 102, the originating party 104 (at the communication device 110), and the relying party 106 each possess a key from the key set originally generated based on the secret (or private key in the above example), by which the encrypted data associated with the originating party 104 was encrypted. It should also be appreciated, again, that the keys from the key set are the only remaining means by which the encrypted data is to be decrypted. It should further be appreciated that the originating party 104 may traverse the method 300 as often as desired and/or required, whereby different key sets may be associated with different encrypted data, with different keys and/or different encrypted data intended for different relying parties. In connection therewith, for example, the control party 102 may include several, multiple, or more instances of encrypted data and keys for the originating party 104.

Figure 4:
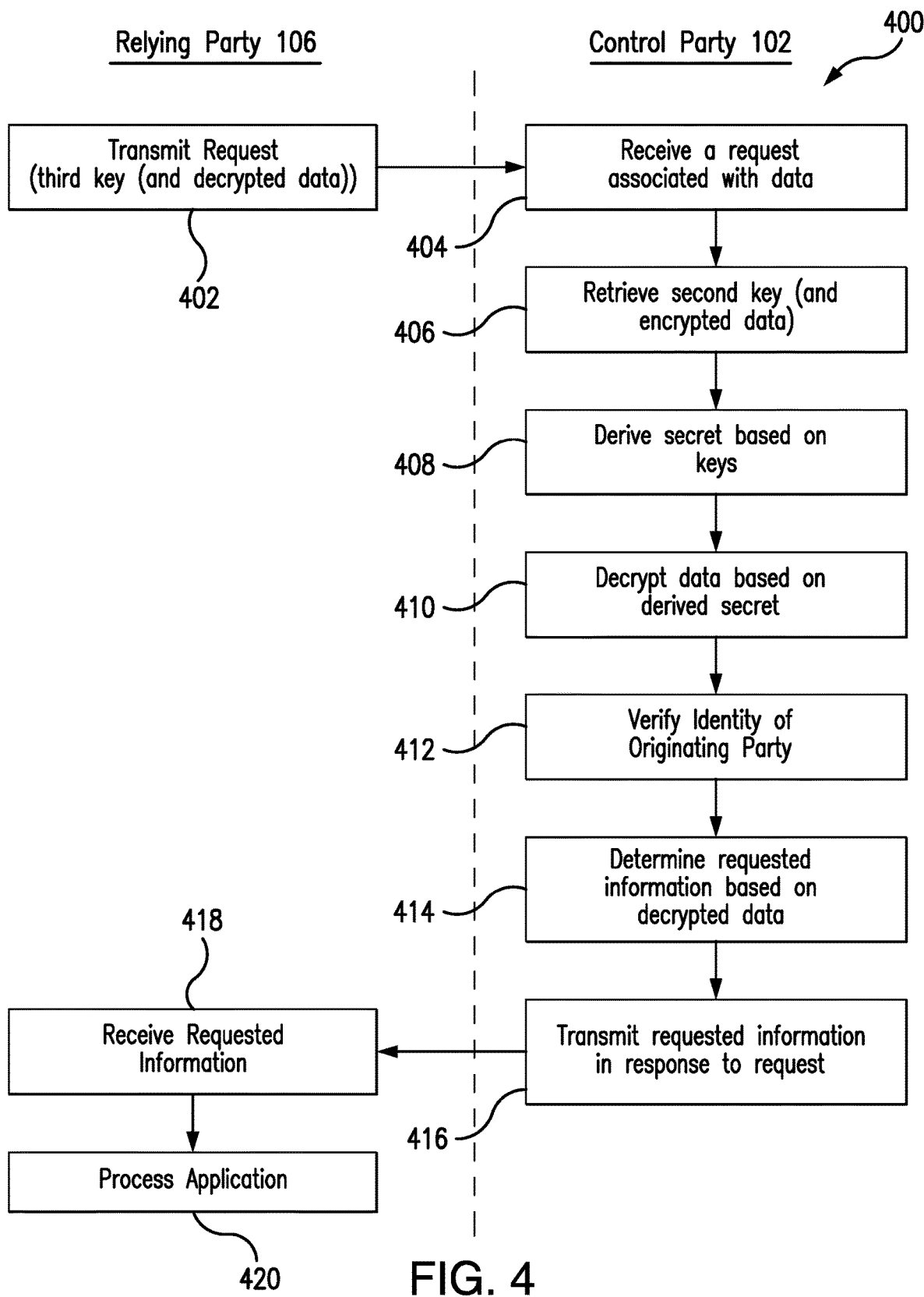
FIG. 4 is a flow diagram for an exemplary method, which may be implemented in connection with the system of FIG. 1, for use in accessing encrypted data across a network based on key sets.

FIG. 4 illustrates an exemplary method 400 for use in accessing encrypted data, across a network based on key sets. The exemplary method 400 is described as implemented in the control party 102, with reference to the originating party 104 and the relying party 106 of the system 100. Reference is also made, again, to the computing device 200. However, the methods herein should not be understood to be limited to the system 100 or the computing device 200, as the methods may be implemented in other systems and/or computing devices. Likewise, the systems and the computing devices herein should not be understood to be limited to the exemplary method 400. The method 400 is also described with reference to the keys of the key set included in Table 3, which were generated based on the private key in Table 1 and disseminated in the method 300 to each of the control party 102, the originating party 104, and the relying party 106.

As shown in the illustrated method 400, when the originating party 104 interacts with the relying party 106 (e.g., after the operations of method 300 are performed, etc.), for example, to open the credit account for the originating party 104, the relying party 106, and in particular, the share application 114 at the computing device thereof, submits, at 402, a request to the control party 102 in association with the encrypted data. In this example, the request includes a request for a credit report from the control party 102. In so doing, the request includes at least the third key of the key set, but may also include the token, the encrypted data or other suitable information (e.g., related to the specific request, or the originating party 104, etc.), or both. It should be appreciated that the request may be related to, or associated with, any aspect of the data encrypted by the originating party 104, whether included in the encrypted data and known to the control party 102, or accessible to the control party 102 based on the encrypted data.

In turn in the method 400, at 404, the request (from the relying party 106 and including at least the third key of the key set) is received by the control party 102. In response to the request, the control party 102 retrieves, at 406, the second key from its memory (e.g., the memory 204, etc.) and also the encrypted data (if not included in the request) from its memory (e.g., the memory 204, etc.). In so doing, the control party 102 may identify the encrypted data and the second key based on the token received from the relying party 106 (when provided) or based on other information about the originating party 104 (e.g. as included in the request, etc.). And, at 408, the control party 102 then reconstructs, or derives, the secret (or private key) based on the second key of the key set (from its memory) and the third key of the key set (from the relying party 106 in the request). This is accomplished, for example, again using the second and third keys and the Shamir secret sharing algorithm (when used to generate the key set).

Then, at 410, the control party 102 decrypts the encrypted data through use of the derived secret and the AES-CBC mode (or, other suitable encryption algorithm (e.g., symmetric, etc.), such as, for example, AES-GCM, etc. (as used for encryption)). In this example, the control party decrypts the encrypted data to obtain the government ID number for the originating party 104 (e.g., 111-22-3333, etc.) and the mailing address for the originating party 104 (e.g., 321 Main Street, City, State, 98765, etc.). In turn, based on the decrypted data, the control party 102 verifies, at 412, the identity of the originating party 104. In particular, the request from the relying party 106 may include, for example, a name, mailing address, email address, phone number, birthdate or other identifying information associated with the originating user (or information known to the originating party 104 and included in the request (e.g., a passcode/password, etc.)). The encrypted data further includes the same information, whereby, upon decryption of the data, the control party 102 is able to verify the identity by matching the information in the request to the information included in the decrypted data. In general, when there is a match, the identity of the originating party 104 is verified. If not, the identity of the originating party is not verified (e.g., meaning a potential fraud occurrence, etc.), whereupon the control party 102 issues a warning, error or notice error in response to the request to the relying party 106. The relying party 106 may proceed accordingly to modify the request and try again or to halt the interaction(s).

When the originating party 104 is verified, however, the control party 102 then determines, at 414, the requested information, either as included in the decrypted data or based on the decrypted data. Here, because the request relates to a credit score for the originating party 104, the control party 102 submits a request to one or more credit bureau(s) for the credit score (e.g., runs a credit report, etc.), based on the decrypted data, where the credit score request includes the government ID number of the originating party 104 and the mailing address. When the credit score is returned from the credit bureau(s), the control party 102 then compiles a reply to the relying party's request (including the credit score, range of credit score, and/or other information requested by the relying party 106) and transmits, at 416, the reply to the relying party 106. In turn, the relying party receives the reply including the requested information, at 418, and then proceeds at 420, to process the application or otherwise proceed in the interactions with the originating party 104, which facilitated the identity verification of the originating party 104. For example, the relying party 106 may proceed (when the requested information is as expected or sufficient (as compared to one or more thresholds) to open the credit account for the originating party. In this manner, the reply by the control party 102 to the request originally provided by the relying party 106 is based on the encrypted data, as decrypted by the control party 102 (i.e., it includes the credit score determined based on the encrypted data), but does not (in this example) include the actual encrypted data (i.e., it does not include the government ID number of the originating party 104 or the mailing address of the originating party 104).

It should be appreciated that the type of information requested, by the relying party 106, will often impact and/or define how the control party 102 determines the information. In at least one embodiment, for example, the control party 102 may determine that the requested information is included in the decrypted data and, as such, may merely transmit that data (once decrypted) back to the relying party (either directly, or via another round of encryption). For instance, in the above example, the reply by the control party 102 to the request originally provided by the relying party 106 may additionally (or alternatively) include at least some of the encrypted data (e.g., the reply may include one or both of the government ID number of the originating party 104 and the mailing address of the originating party 104, etc.).

In addition, it should be appreciated that that the originating party 104 may seek to alter (or modify) or to confirm the information included in the encrypted data already provided to the control party 102 and/or the relying party 106, for example, when the data is changed (e.g., a payment account number is changed, a mailing address is changed, etc.). Here, and similar to the above, the originating party 104 may submit a request to the control party 102 to alter the encrypted data, where the request includes the new data/information and the first key of the originating party's key set. In response, as above, the control party 102 retrieves the second key for the originating party 104 and then, instead of decrypting the data, encrypts the new data with the first and second key of the key set (if not already encrypted). The control party 102 then stores the newly encrypted data in place of the old encrypted data, whereby upon a further request from the relying party 106, the control party 102 will retrieve and decrypt the newly encrypted data. Alternatively, method 300 may be repeated based on the updated data (where any prior versions of the encrypted data may be deleted and replace with the updated data provided by the originating party 104).

In view of the above, the systems and methods herein permit securing sensitive data across a network. In particular, the use of the key set requires that multiple parties are involved in the decryption of the data, so that a breach of security and/or unauthorized access at one party will be insufficient to understand the encrypted data. What's more, by use of the control party, the relying party may be limited in access to the data desired rather than being an unrestricted means to that data. That is, in the above example, the relying party 106 sought a credit score for the originating party 104. Conventionally, the relying party 106 would collect the government ID number of the originating party 104 and then seek the credit score (e.g., from a credit bureau that relies on the government ID to retrieve the credit score, etc.). In this manner, the relying party 106 would receive and hold the government ID number—a potential point of theft of the number—while not actually relying on the number itself. In the systems and methods herein, the relying party 106 is shielded from the government ID number, yet still able to capture the credit score (i.e., the desired information). As such, the systems and methods herein provide for secure network interactions which limit and/or reduce the exposure of certain data related to an originating party.

Again and as previously described, it should be appreciated that the functions described herein, in some embodiments, may be described in computer executable instructions stored on a computer readable media, and executable by at least one processor. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) identifying, by an originating party, a relying party; (b) identifying data relevant to at least one interaction between the originating party and the relying party, the data including identifying data specific to the originating party; (c) encrypting, by a computing device, the data based on a secret; (d) generating, by a computing device, a key set based on the secret, the key set having at least three keys and structured such that the secret is derivable from at least two of the at least three keys; (e) disseminating, by the computing device, a first key of the key set and the encrypted data to a control party; (f) disseminating, by the computing device, a second key of the key set to the relying party, whereby the relying party is permitted to submit a request to the control party, including the second key, and whereby the control party is permitted to decrypt the encrypted data disseminated to the control party, using the first and second keys, in order to respond to the request from the relying party; (g) generating a token and associating the token with the key set, prior to disseminating the first key and the second key; (h) receiving the request from the relying party, the request including the second key of the key set; (i) retrieving, by a second computing device associated with the control party, the first key from memory associated with the second computing device; (j) deriving, by the second computing device, the secret from the first and second keys; (k) decrypting, by the second computing device, the encrypted data disseminated to the control party based on the derived secret; (l) transmitting, by the second computing device, a reply to the relying party in response to the request, the reply based on the encrypted data as decrypted by the second computing device but not including the actual encrypted data; (m) storing a third key of the key set in memory of the computing device; (n) transmitting, by the computing device, a request to the control party to modify and/or confirm the encrypted data disseminated to the control party, the request including the third key, whereby the control party is permitted to decrypt the encrypted data using the first and third keys in order to modify and/or confirm the encrypted data based on the request from the originating party; and (o) generating, by the computing device, the secret prior to encrypting the data based on the secret.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in managing certain data across a network based on multiple keys assigned to different participants in association with the certain data, the method comprising:
    identifying, by an originating party, a relying party;
    identifying data relevant to at least one interaction between the originating party and the relying party, the data including identifying data specific to the originating party;
    encrypting, by a computing device, the data based on a secret;
    generating, by the computing device, a key set based on the secret, the key set having at least three keys and structured such that the secret is derivable from at least two of the at least three keys;
    disseminating, by the computing device, a first key of the key set and the encrypted data to a control party; and
    disseminating, by the computing device, a second key of the key set to the relying party, thereby enabling the relying party to submit a request including the second key to the control party and the control party to decrypt the encrypted data disseminated to the control party, using the first and second keys, in order to respond to the request from the relying party.

2. The computer-implemented method of claim 1, wherein generating the key set includes generating the key set based on the secret and a Shamir secret sharing algorithm.

3. The computer-implemented method of claim 2, further comprising generating a token and associating the token with the key set, prior to disseminating the first key and the second key; and
    wherein disseminating the first key and the encrypted data to the control party includes disseminating the first key, the encrypted data, and the token to the control party; and
wherein disseminating the second key to the relying party includes disseminating the second key and the token to the relying party.

4. The computer-implemented method of claim 2, wherein the identifying data includes a government ID number associated with the originating party; and
    wherein the request includes a request for a credit score.

5. The computer-implemented method of claim 1, further comprising:
    receiving the request from the relying party, the request including the second key of the key set;
    retrieving, by a second computing device associated with the control party, the first key from memory associated with the second computing device;
    deriving, by the second computing device, the secret from the first and second keys; and
    decrypting, by the second computing device, the encrypted data disseminated to the control party based on the derived secret.

6. The computer-implemented method of claim 5, further comprising transmitting, by the second computing device, a reply to the relying party in response to the request, the reply based on the encrypted data as decrypted by the second computing device but not including the actual encrypted data.

7. The computer-implemented method of claim 1, further comprising:
    storing a third key of the key set in memory of the computing device; and
    transmitting, by the computing device, a request to the control party to modify and/or confirm the encrypted data disseminated to the control party, the request including the third key, thereby enabling the control party to decrypt the encrypted data using the first and third keys in order to modify and/or confirm the encrypted data based on the request from the originating party.

8. The computer-implemented method of claim 1, further comprising generating, by the computing device, the secret prior to encrypting the data based on the secret.

9. The method of claim 1, further comprising:
    submitting, by the relying party, the request including the second key to the control party; and
    decrypting, by the control party, the encrypted data disseminated to the control party, using the first and second keys, in order to respond to the request from the relying party.

10. A system for use in managing certain data across a network based on multiple keys assigned to different participants in association with the certain data, the system comprising an originating party computing device having a memory and a processor coupled to the memory, the processor configured, by executable instructions stored in the memory of the originating party computing device, to:
    receive, from an originating party, an indication of a relying party in connection with an identification interaction of the originating party to the relying party;
    encrypt data based on a secret, the data including identifying data specific to the originating party;
    generate a key set based on the secret and store the key set in the memory, the key set having at least three keys and structured such that the secret is derivable from at least two of the at least three keys;
    generate a token associated with the originating party, the encrypted data and/or the key set;
    disseminate the token, a first key of the key set, and the encrypted data to a control party; and
    disseminate the token and a second key of the key set to the relying party, thereby enabling the relying party to submit a request including the token and the second key to the control party and the control party to identify the first key based on the token and to decrypt the encrypted data disseminated to the control party, using the first and second keys, in order to respond to the request from the relying party.

11. The system of claim 10, where in the processor of the originating party computing device is further configured, by the executable instructions, to generate the secret prior to encrypting the data based on the secret.

12. The system of claim 11, wherein the processor of the originating party computing device is configured, by the executable instructions, in connection with generating the key set, to generate the key set based on the secret and a Shamir secret sharing algorithm.

13. The system of claim 10, wherein the processor of the originating party computing device is further configured, by the executable instructions, to store a third key of the key set in the memory of the originating party computing device.

14. The system of claim 13, further comprising a control party computing device associated with the control party, the control party computing device having a memory and a processor coupled to the memory, the processor of the control party computing device configured, by executable instructions stored in the memory of the control party computing device, to:
    receive the request from the relying party, the request including the second key of the key set;
    retrieve, from the memory of the control party computing device, the first key disseminated to the control party by the processor of the originating party computing device;
    derive the secret from the first and second keys;
    decrypt the encrypted data based on the derived secret; and
    transmit a reply to the request to the relying party, the reply including decrypted data and/or data accessible based on the decrypted data.

15. The system of claim 14, wherein the request includes at least one of a name, address, phone number and birthdate of the originating party; and
    wherein the control party computing device is configured to verify the identity of the originating party based on the decrypted data and the at least one of the name, address, phone number and birthdate of the originating party, prior to transmitting the reply to the request to the relying party.

16. The system of claim 15, wherein the reply transmitted to the relying party includes at least some of the encrypted data but does not include all of the encrypted data.

17. The system of claim 14, wherein the processor of the originating party computing device is further configured, by the executable instructions stored in the memory of the originating party computing device, to transmit a request to the control party to modify and/or confirm the encrypted data disseminated to the control party, the request including the third key.

18. The system of claim 17, wherein the processor of the control party computing device is further configured, by the executable instructions stored in the memory of the control party computing device, to decrypt the encrypted data using the first and third keys and to modify and/or confirm the encrypted data based on the request from the processor of the originating party computing device.

19. A non-transitory computer-readable storage media including executable instructions for use in managing certain data across a network based on multiple keys assigned to different participants in association with the certain data, which, when executed by at least one processor, cause the at least one processor to:
    identify a relying party;
    encrypt data based on a secret, the data including identifying data specific to the originating party;
    generate a key set based on the secret and a Shamir secret sharing algorithm, the key set having N keys and structured such that the secret is derivable from at least N−1 of the N keys, where N is an integer greater than 2;
    disseminate a first key of the key set and the encrypted data to a control party; and
    disseminate a second key of the key set to the relying party, thereby enabling the relying party to submit a request associated with the data and including the second key to the control party and the control party to decrypt the encrypted data disseminated to the control party, by use of the first and second keys, in order to respond to the request from the relying party.

20. The non-transitory computer-readable storage media of claim 19, wherein the executable instructions, when executed by the at least one processor, further cause the at least one processor to:
    generate a token and associate the token with the key set, prior to disseminating the first key and the second key;
    disseminate the token along with the first key and the encrypted data to the control party; and
    disseminate the token along with the second key to the relying party.

* * * * *